P. W. SCHOLLAR.
RETAINING AND RELEASING DEVICE FOR ROPES, CORDAGE, AND THE LIKE.
APPLICATION FILED SEPT. 8, 1919.

1,392,260.  
Patented Sept. 27, 1921.

Percy William Schollar,
INVENTOR

By his Attorney:

UNITED STATES PATENT OFFICE.

PERCY WILLIAM SCHOLLAR, OF LONDON, ENGLAND, ASSIGNOR TO E. R. CALTHROP'S AERIAL PATENTS LIMITED, OF LONDON, ENGLAND.

RETAINING AND RELEASING DEVICE FOR ROPES, CORDAGE, AND THE LIKE.

1,392,260. Specification of Letters Patent. Patented Sept. 27, 1921.

Application filed September 8, 1919. Serial No. 322,544.

*To all whom it may concern:*

Be it known that I, PERCY WILLIAM SCHOLLAR, a subject of the King of Great Britain, residing at London, in the county of Middlesex, England, have invented new and useful Improvements Relating to Retaining and Releasing Devices for Ropes, Cordage, and the like, of which the following is a specification.

This invention has reference to devices for retaining and releasing ropes, cordage and the like and has for its chief object to provide an improved device by means of which two or more ropes or the like may be securely connected together and rapidly released when occasion demands their separation.

A device under this invention is particularly adapted for use with parachutes to provide a secure and readily manipulated connection between the load rope and the aviator's sling or harness so that when a descent is made the aviator upon reaching the ground may rapidly detach himself from the parachute and so obviate any danger of being dragged by the latter but it is to be understood that the invention is not to be considered as limited to this specified purpose but is capable of general application in all cases where it is desired to detachably connect ropes or the like with the facility of rapid disconnection or release.

In order that the invention may be readily understood and carried into effect the same will now be fully described with reference to the accompanying drawings in which:—

Figure 1:
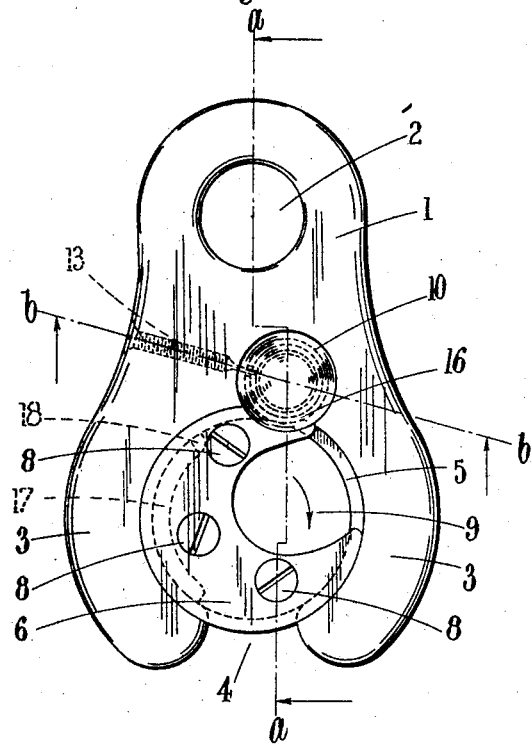
Figure 1 represents an elevation of a device embodying this invention.

In that embodiment of the invention illustrated the numeral 1 represents a block or plate having an eye 2 located near one end by means of which one of the ropes to be connected may be positively attached to the device such as by nosing the rope through said eye and knotting or splicing it. The block or plate 1 is formed with two curved limbs 3 in such a manner that an approximately circular aperture is formed having an opening or passage the purpose of which will presently be explained. The edges of the circular aperture are rabbeted as indicated at 5 to form bearings for an approximately circular member 6 which is rotatably mounted in said aperture. For convenience of manufacture and assembly the member 6 is preferably made in two portions (see Fig. 2) each having a peripheral flange 7 adapted to engage the rabbeted portions 5 of the aforesaid aperture in the plate 1 the two portions when in position within said aperture being connected by screws or rivets 8.

The circular member 6 is formed with an aperture 9 adapted for the reception of the other of the ropes or the like to be connected by means of the device and means are provided for locking said member 6 in position within the aperture in the plate 1 in which it is rotatably mounted. This locking means in the construction illustrated comprises spring biased buttons 10 and 11 which as will be seen from an inspection of Fig. 2 are tubular. Said buttons are located in an aperture formed in the plate 1 and are adapted to slide one within the other against the resistance of a helical or other spring 12 mounted within the tubular portions of said buttons. These tubular press buttons are retained in operative relation within the aperture in the plate 1 formed for their reception by means of a screw or pin 13 the extremity of which enters longitudinal slots 14 and 15 cut in the tubular portions of the buttons 10 and 11 in such a manner that while allowing limited axial movement of said buttons they will be prevented from being forced out of their housing in the plate 1 by the spring 12. The two flanges 7 of the circular member 6 are cut away as indicated at 16 in Fig. 1 and it will be seen that with the parts in the position shown in that figure the heads of the buttons 10 and 11 engage said cut away portions 16 and thus lock the circular member 6 against rotation.

As will presently be apparent when the operation of my improved device is considered the rotatably mounted member 6 is adapted during the operation of releasing the rope retained thereby to rotate in the direction of the arrow that is to say in a clockwise direction and I preferably employ means for arresting it in the position in which the recess 9 therein is in register with the aperture 4 between the limbs 3 of the block or plate 1. One means of effecting this is by providing the member 6 with an arcuate recess or groove 17 in which is adapted to engage a projecting lug or stop 18 formed or provided on one of the limbs 3 of the block or plate 1. By this means the member 6 will be limited in its angular movement relatively to the block or plate 1 and will be arrested when the aperture 9 therein is opposite the aperture 4.

As before stated my improved device is more particularly intended for the use of aviators during parachute descents as a means of rapidly disconnecting themselves from the parachute load rope on reaching the ground and in this aspect of my invention the operation is as follows:—

Figure 2:
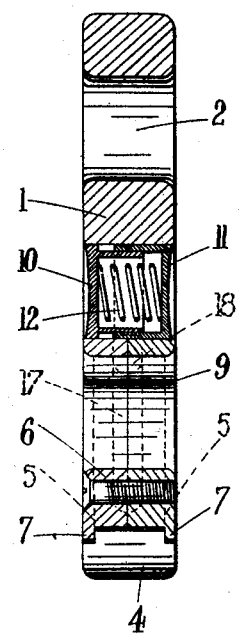
Fig. 2 illustrates a vertical section of the same taken on line *a—a* of Fig. 1
Figure 3:
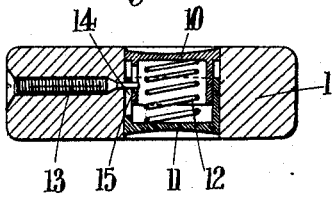
Fig. 3 is a transverse section taken on line *b—b* of Fig. 1.

The parachute load rope being positively connected to the eye 2 the spring buttons 10 and 11 are pressed inward with the thumb and forefinger thus disengaging their heads from the recessed or cut away portions 16 of the member 6 which will then be free to be rotated in the direction of the arrow in Fig. 1 until the recess 9 is in register with the aperture 4. The eye or loop of the suspension rope attached to the aviator's harness is then inserted in the aperture 9 and the member 6 rotated in a counter clockwise direction until the recesses 16 come opposite the spring buttons 10 and 11 which latter will thereupon be forced outward by the spring 12 to engage said recesses 16 thereby locking the member 6 against further rotation. The parachute load rope and the aviator's harness rope will thus be securely connected together and when it is desired to disconnect them it is only necessary to press the spring biased buttons 10 and 11 inward whereupon the member 6 will be freed to rotate. It will be observed that the aperture 9 is arranged at one side of the vertical central line of the device so that when the buttons 10 and 11 are manipulated any strain exerted upon the device through the ropes connected thereby will operate automatically to cause a partial rotation of the member 6 and bring the recess 9 therein in register with the aperture 4 thus releasing the bight of the rope lying in said recess 9.

While I have described the preferred construction and operation of a device embodying my invention I do not wish to be understood as limiting myself to the positive terms employed in connection with the description as numerous changes may be made without affecting the spirit and scope of my invention as expressed in the appended claims.

What I claim and desire to secure by Letters Patent of the United States of America is:—

1. A device for detachably connecting ropes comprising a block having an eye for the attachment of a rope thereto, an aperture in said block, a member rotatably mounted in said block and having a recess therein adapted in one position of the member to register with the said aperture, and a pair of spring controlling buttons which are normally pressed in opposite directions to lock said rotatable member and can be pressed together to release said member to permit of partial rotation thereof.

2. A device for detachably connecting ropes comprising a block having an eye for the attachment of a rope thereto, an aperture in said block, a member rotatably mounted in said block and having a recess therein adapted in one position of the member to register with the said aperture, a pair of spring controlled buttons one of which is movable within the other and which are normally pressed in opposite directions to lock said rotatable member and can be pressed together to release said member to permit of partial rotation thereof, and means in said block for limiting the movement of said buttons.

3. A device for detachably connecting ropes comprising a block having an eye for the attachment of a rope thereto, an aperture in said block, a member rotatably mounted in said block and having a recess therein adapted in one position of the member to register with the said aperture, a pair of spring controlled buttons one of which is movable within the other and which are normally pressed in opposite directions to lock said rotatable member and can be pressed together to release said member to permit of partial rotation thereof, slots in said buttons, a pin in said block in engagement with said slots to limit the movement of said buttons, a groove in said rotatable member and a stop on said block in engagement with said groove to limit the movement of the said member.

PERCY WILLIAM SCHOLLAR.